(12) United States Patent
Li et al.

(10) Patent No.: US 11,509,505 B2
(45) Date of Patent: Nov. 22, 2022

(54) METHOD AND APPARATUS FOR OPERATING SMART NETWORK INTERFACE CARD

(71) Applicant: BEIJING BAIDU NETCOM SCIENCE AND TECHNOLOGY CO., LTD., Beijing (CN)

(72) Inventors: Deguo Li, Beijing (CN); Fengqian Wang, Beijing (CN); Jiaoren Wu, Beijing (CN); Jian Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 26 days.

(21) Appl. No.: 16/374,469

(22) Filed: Apr. 3, 2019

(65) Prior Publication Data
US 2019/0372804 A1 Dec. 5, 2019

(30) Foreign Application Priority Data
May 31, 2018 (CN) .......................... 201810551833.5

(51) Int. Cl.
*G06F 15/173* (2006.01)
*H04L 12/66* (2006.01)
*H04L 41/0803* (2022.01)

(52) U.S. Cl.
CPC .......... *H04L 12/66* (2013.01); *H04L 41/0803* (2013.01)

(58) Field of Classification Search
CPC ........ G06F 13/20; G06F 13/42; G06F 13/385; G06F 13/4068; G06F 21/554; G06F 8/61; G06F 11/2092; G06F 11/2736; G06F 11/0721; G06F 11/322; H04W 12/0806; H04L 41/28; H04L 41/0853;
(Continued)

(56) References Cited

U.S. PATENT DOCUMENTS 5,737,520 A * 4/1998 Gronlund .............. G06F 11/322
714/39
7,734,748 B1 * 6/2010 Durairaj ................ H04L 45/563
709/224
(Continued)

FOREIGN PATENT DOCUMENTS

CN 102609349 A 7/2012
CN 106933753 A 7/2017
(Continued)

*Primary Examiner* — Dustin Nguyen
(74) *Attorney, Agent, or Firm* — Seed IP Law Group LLP

(57) ABSTRACT

A method and apparatus for operating a smart network interface card are provided. According to an embodiment, the smart network interface card is connected to a baseboard management controller. The method includes: acquiring a smart network interface card detection request, the smart network interface card detection request includes an identifier of a to-be-detected smart network interface card; determining a baseboard management controller that is connected to the to-be-detected smart network interface card as a target baseboard management controller; and logging into an operating system of the to-be-detected smart network interface card through the target baseboard management controller. This embodiment provides a new approach of operating the smart network interface card.

19 Claims, 5 Drawing Sheets

(58) Field of Classification Search
CPC . H04L 47/762; H04L 43/0817; H04L 45/563; H04L 9/3234; H04L 63/0815; H01R 13/175; G06Q 20/3552
See application file for complete search history.

(56) References Cited

U.S. PATENT DOCUMENTS

| | | | | |
|---|---|---|---|---|
| 9,405,525 | B2* | 8/2016 | Kuroki | G06F 8/61 |
| 2005/0289646 | A1* | 12/2005 | Zimmer | G06Q 20/3552 |
| | | | | 711/E12.102 |
| 2006/0036906 | A1* | 2/2006 | Luciani | H04L 43/0817 |
| | | | | 714/11 |
| 2007/0011507 | A1* | 1/2007 | Rothman | G06F 11/2736 |
| | | | | 714/718 |
| 2007/0118641 | A1* | 5/2007 | Zhuo | G06F 21/554 |
| | | | | 709/224 |
| 2007/0226377 | A1* | 9/2007 | Jreij | G06F 13/385 |
| | | | | 710/8 |
| 2008/0140819 | A1* | 6/2008 | Bailey | G06F 13/385 |
| | | | | 709/223 |
| 2011/0238818 | A1* | 9/2011 | Wang | H04L 41/0853 |
| | | | | 709/224 |
| 2014/0195704 | A1* | 7/2014 | Bhatia | G06F 13/42 |
| | | | | 710/105 |
| 2014/0250320 | A1* | 9/2014 | Nyuunoya | G06F 11/2092 |
| | | | | 714/4.11 |
| 2015/0077911 | A1* | 3/2015 | Hsu | H01R 13/7175 |
| | | | | 361/679.02 |
| 2015/0304233 | A1* | 10/2015 | Krishnamurthy | H04L 47/762 |
| | | | | 709/226 |
| 2015/0378810 | A1* | 12/2015 | Nakamura | G06F 11/0721 |
| | | | | 714/10 |
| 2016/0080210 | A1* | 3/2016 | Lai | G06F 13/20 |
| | | | | 709/224 |
| 2016/0127167 | A1 | 5/2016 | Chou et al. | |
| 2017/0180987 | A1* | 6/2017 | Tung | H04L 9/3234 |
| 2018/0183758 | A1* | 6/2018 | Itkin | H04L 41/28 |
| 2018/0239730 | A1* | 8/2018 | Itkin | G06F 13/385 |
| 2018/0307643 | A1* | 10/2018 | Zhang | G06F 13/4068 |
| 2018/0336324 | A1* | 11/2018 | Kodama | H04W 12/0806 |
| 2019/0379656 | A1* | 12/2019 | Gore | H04L 63/0815 |

FOREIGN PATENT DOCUMENTS

| | | |
|---|---|---|
| CN | 108052449 A | 5/2018 |
| JP | 2011118663 A | 6/2011 |
| JP | 2017054347 A | 3/2017 |

* cited by examiner

METHOD AND APPARATUS FOR OPERATING SMART NETWORK INTERFACE CARD

CROSS-REFERENCE TO RELATED APPLICATIONS

This disclosure claims priority to Chinese Patent Application no. 201810551833.5, filed with the China National Intellectual Property Administration (CNIPA) on May 31, 2018, the contents of which are incorporated herein by reference in their entirety.

TECHNICAL FIELD

Embodiments of the present disclosure relate to the field of computer technology, and specifically to a method and apparatus for operating a smart network interface card.

BACKGROUND

A smart network interface card (smart NIC) is generally used to connect a server and a network device such as a switch. The fundamental difference between the smart NIC and a common NIC lies in that the smart NIC may reduce the amount of data processing for the CPU of a host (e.g., a server host). The smart NIC may have its independent resources such as a CPU, a random access memory operating system, and a hardware acceleration unit.

SUMMARY

Embodiments of the present disclosure provide a method and apparatus for operating a smart network interface card.

In a first aspect, the embodiments of the present disclosure provide a method for operating a smart network interface card. The smart network interface card is connected to a baseboard management controller. The method includes: acquiring a smart network interface card detection request, the smart network interface card detection request includes an identifier of a to-be-detected smart network interface card; determining a baseboard management controller that is connected to the to-be-detected smart network interface card as a target baseboard management controller; and logging into an operating system of the to-be-detected smart network interface card through the target baseboard management controller.

In a second aspect, the embodiments of the present disclosure provide an apparatus for operating a smart network interface card. The smart network interface card is connected to a baseboard management controller. The apparatus includes: an acquisition unit, configured to acquire a smart network interface card detection request, the smart network interface card detection request includes an identifier of a to-be-detected smart network interface card; a determination unit, configured to determine a baseboard management controller that is connected to the to-be-detected smart network interface card as a target baseboard management controller; and a login unit, configured to log into an operating system of the to-be-detected smart network interface card through the target baseboard management controller.

In a third aspect, the embodiments of the present disclosure provide an electronic device. The electronic device includes: one or more processors; and a storage device, configured to store one or more programs. The one or more programs, when executed by the one or more processors, cause the one or more processors to implement the method according to any implementation in the first aspect.

In a fourth aspect, the embodiments of the present disclosure provide a computer readable storage medium storing a computer program. The computer program, when executed by a processor, implements the method according to any implementation in the first aspect.

According to the method and apparatus for operating a smart network interface card provided by the embodiments of the present disclosure, the smart network interface card detection request is acquired. Next, the baseboard management controller that is connected to the to-be-detected smart network interface card is determined as the target baseboard management controller. Then, the to-be-detected smart network interface card is logged into through the target baseboard management controller. Thus, a new approach of operating the smart network interface card is provided.

BRIEF DESCRIPTION OF THE DRAWINGS

After reading detailed descriptions of non-limiting embodiments given with reference to the following accompanying drawings, other features, objectives, and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
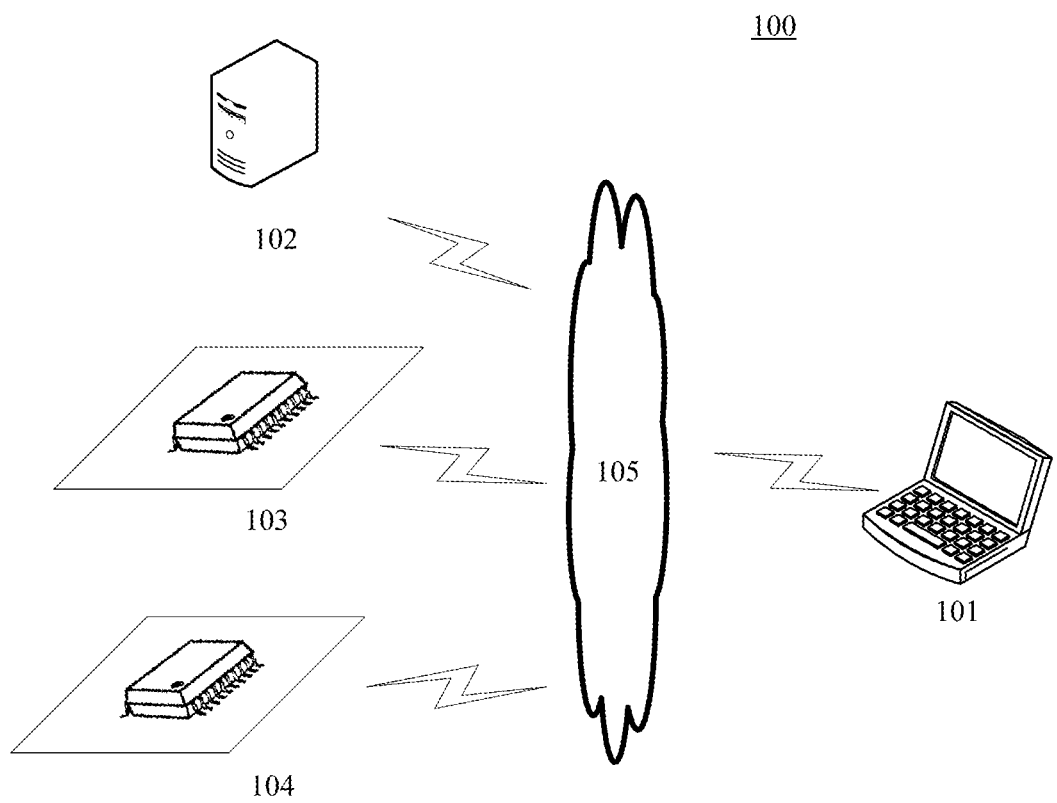
FIG. 1 illustrates an illustrative system architecture in which the present disclosure may be applied.

FIG. 1 illustrates an illustrative system architecture 100 in which an embodiment of a method for operating a smart network interface card or apparatus for operating a smart network interface card according to the present disclosure may be applied.

As shown in FIG. 1, the system architecture 100 may include a terminal device 101, a server 102, a baseboard management controller 103, a smart network interface card 104, and a network 105.

The network 105 may be a medium for providing a communication link between the terminal device 101 and the baseboard management controller 103 and between the baseboard management controller 103 and the smart network interface card 104. The network 105 may include various connection types, for example, a wired communication link and a wireless communication link.

The baseboard management controller (BMC) may be used in server monitoring, including collecting a CPU temperature, a fan rotation speed, and a motherboard temperature, and remotely turning on/off the server. BMC is a discrete card that is supplied with power independently. The setting of the baseboard management controller is based on an intelligent platform management interface (IPMI). IPMI is an industry standard. A user may use IPMI to monitor the physical health characteristics of the server, for example, the temperature, the voltage, the fan operating state, and the power state. Moreover, IPMI is an open and free standard.

The core hardware of IPMI is BMC. Therefore, IPMI is independent of the hardware and the operating system of the server. Accordingly, neither the failure of the CPU and the basic input/output system (BIOS) of the server nor the failure of the operating system of the server would affect the operating of IPMI.

The smart network interface card (smart NIC) is generally used to connect the server and a network device such as a switch. The fundamental difference between the smart NIC and a common NIC lies in that the smart NIC may reduce the amount of data processing for the CPU of a host (e.g., a server host). The smart NIC may have self-contained resources such as a CPU, a random access memory operating system, and a hardware acceleration unit.

The user may interact with the baseboard management controller through the network 105 using the terminal device 101, to receive or transmit information. Various communication client applications, for example, an intelligent platform management type client and an instant communication tool, may be installed on the terminal device 101.

The terminal device 101 may be hardware or software. When being the hardware, the terminal device 101 may be various electronic devices having a display screen, including, but not limited to, a smart phone, a tablet computer, an e-book reader, and an MP3 (moving picture experts group audio layer III) player, an MP4 (moving picture experts group audio layer IV) player, a laptop portable computer and a desktop computer. When being the software, the terminal device 101 may be installed on the listed electronic devices. The terminal device 101 may be implemented as a plurality of pieces of software or a plurality of software modules, or as a single piece of software or a single software module, which will not be specifically limited herein.

The server 102 may be a server providing various services, for example, a server monitored by the baseboard management controller 103 described above.

It should be noted that the method for operating a smart network interface card provided by the embodiment of the present disclosure is generally performed by the terminal device 101. Correspondingly, the apparatus for operating a smart network interface card is generally disposed in the terminal device 101.

It should be understood that the numbers of the terminal devices, the servers, the baseboard management controllers, the smart network interface cards, and the networks in FIG. 1 are merely illustrative. Any number of terminal devices, networks and servers may be provided based on the actual requirements.

Figure 2:
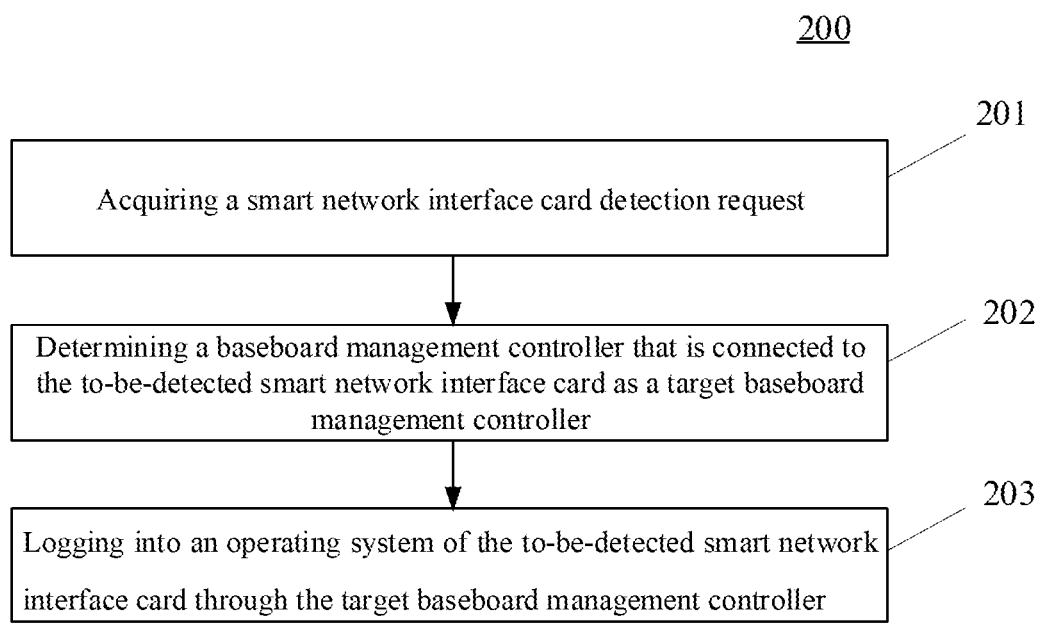
FIG. 2 is a flowchart of an embodiment of a method for operating a smart network interface card according to the present disclosure.

Referring to FIG. 2, a flow 200 of an embodiment of a method for operating a smart network interface card is illustrated. This embodiment is mainly illustrated by taking the method applied to an electronic device having a certain computing capability as an example, and the electronic device may be the terminal device 101 shown in FIG. 1. The method for operating a smart network interface card includes the following steps.

Step 201, acquiring a smart network interface card detection request.

In this embodiment, a performing subject (e.g., the terminal device shown in FIG. 1) of the method for operating a smart network interface card may acquire the smart network interface card detection request. Here, the smart network interface card detection request may include the identifier of a to-be-detected smart network interface card.

In this embodiment, the performing subject may acquire the smart network interface card detection request locally or from other network devices. If the performing subject is not a device monitoring the network connection of a cloud server, the smart network interface card detection request is acquired from the other network devices. If the performing subject is a device monitoring the network connection of the cloud server, the smart network interface card detection request is acquired locally.

Generally, the network device monitoring the network connection of the cloud server may determine the to-be-detected smart network interface card in response to a network failure of the cloud server. That is, when detecting the network failure of the cloud server, the network device determines a smart network interface card providing a network connection support for the cloud server as the to-be-detected smart network interface card. The network device may generate the smart network interface card detection request (including the identifier of the to-be-detected smart network interface card), and then transmit the smart network interface card detection request to the performing subject.

In this embodiment, the smart network interface card may be connected to a baseboard management controller. It should be noted that the connection here may be a physical connection.

Step 202, determining a baseboard management controller that is connected to the to-be-detected smart network interface card as a target baseboard management controller.

In this embodiment, the performing subject (e.g., the terminal device shown in FIG. 1) of the method for operating a smart network interface card may determine the baseboard management controller that is connected to the to-be-detected smart network interface card as the target baseboard management controller.

Optionally, a connection relationship table may be pre-stored. The connection relationship table is used to indicate a connection relationship between the smart network interface card and the baseboard management controller. Specifically, the connection relationship table may correspondingly store the identifiers of the smart network interface card and the baseboard management controller, which have the connection relationship. After acquiring the identifier of the to-be-detected smart network interface card, the terminal may determine, from the connection relationship table, the stored identifier of the baseboard management controller that corresponds to the identifier of the to-be-detected smart network interface card, to determine the target baseboard management controller.

Optionally, the failed cloud server may be first determined. The baseboard management controller monitoring the cloud server is the baseboard management controller that is connected to the to-be-detected smart network interface card. The target baseboard management controller is determined.

Step 203, logging into an operating system of the to-be-detected smart network interface card through the target baseboard management controller.

In this embodiment, the performing subject (e.g., the terminal device shown in FIG. 1) of the method for operating a smart network interface card may log into the operating system of the to-be-detected smart network interface card through the target baseboard management controller.

In this embodiment, step 203 may be implemented in various ways.

In some alternative implementations of this embodiment, the interface, of the target baseboard management controller, that is connected to the to-be-detected smart network interface card may be used as a target interface. Step 203 may be implemented by: sending an interface relocation request to the target baseboard management controller, the interface relocation request being used to request that the target interface of the target baseboard management controller is used as an interface for transmitting data between the target baseboard management controller and the smart network interface card; and logging into the operating system of the to-be-detected smart network interface card through the relocated target interface. This approach does not need to log into the target baseboard management controller.

As an example, the function of the IPMI may be completed by sending a request to the BMC, to request the use of specified instructions in the IPMI. The IPMI provides instructions for implementing various functions. In general, the request sent to the BMC is processed by the BMC. However, the IPMI provides an instruction for the function of the Serial Over LAN (SOL). The information sent to the BMC is sent to the interface relocated by the SOL, and then sent out through the relocated interface. The performing subject may send the interface relocation request including the SOL instruction to the target baseboard management controller. Then, the information sent by the performing subject to the target baseboard management controller is sent to the to-be-detected smart network interface card through the target interface. Accordingly, the performing subject may send login information (e.g., an account number and a password) to the target baseboard management controller, and the login information is sent to the to-be-detected smart network interface card through the target interface. After the authentication of the to-be-detected smart network interface card for the login information is successful, the performing subject logs into the operating system of the to-be-detected smart network interface card.

In some alternative implementations of this embodiment, the step 203 may be implemented by the following approach. The performing subject may log into the operating system of the target baseboard management controller; and log into the operating system of the to-be-detected smart network interface card by using the target interface and the communication protocol between the target baseboard management controller and the to-be-detected smart network interface card. This approach needs to log into the target baseboard management controller.

As an example, the performing subject may send the login information for logging into the operating system of the target baseboard management controller to the target baseboard management controller. After the authentication of the target baseboard management controller is successful, the performing subject may operate on the operating system of the target baseboard management controller, which is equivalent to obtaining the identity of the target baseboard management controller. Therefore, the performing subject may communicate with other devices in the identity of the target baseboard management controller. In general, both the smart network interface card and the baseboard management controller are within the IPMI system, and the communication between the smart network interface card and the baseboard management controller may be performed using the IPMI communication protocol. Therefore, the performing subject may send the login information to the operating system of the to-be-detected smart network interface card through the target interface in the identity of the target baseboard management controller. After the authentication of the to-be-detected smart network interface card is successful, the performing subject may log into the operating system of the to-be-detected smart network interface card.

Figure 3:
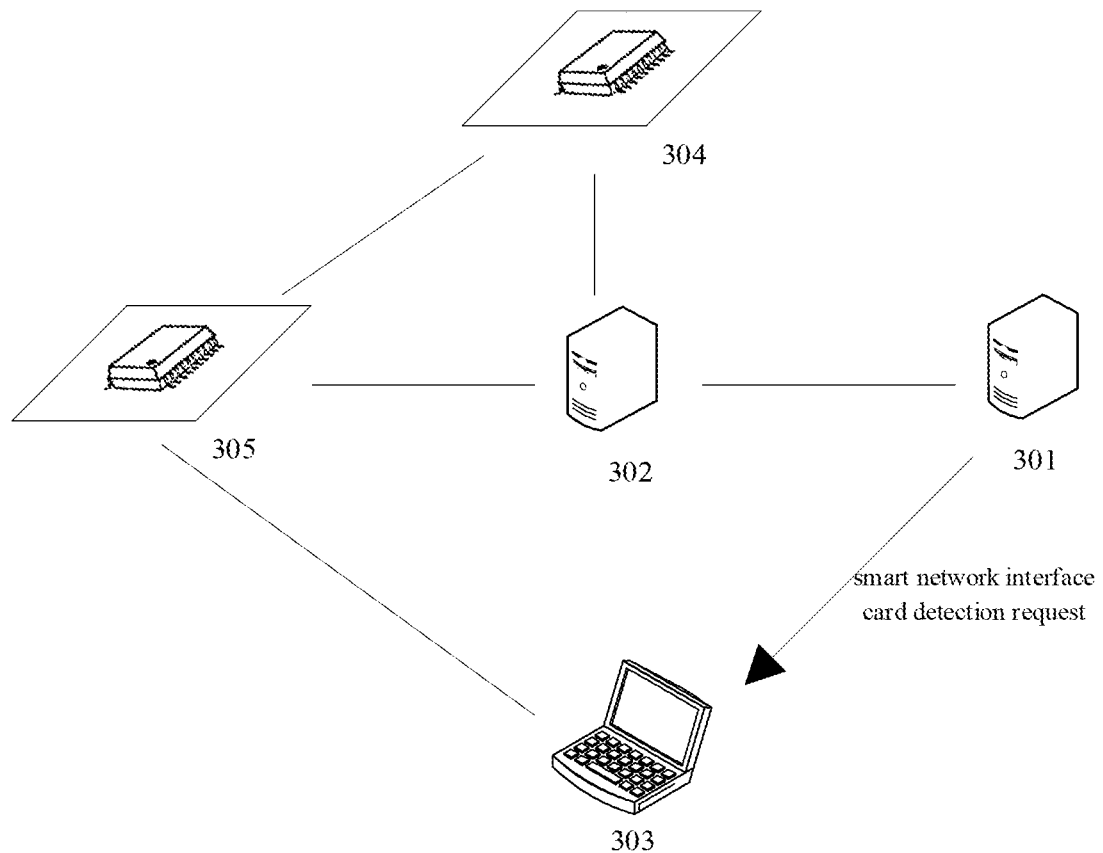
FIG. 3 is a schematic diagram of an application scenario of the method for operating a smart network interface card according to the present disclosure.

Further referring to FIG. 3, a schematic diagram of an application scenario of the method for operating a smart network interface card according to this embodiment is shown.

In the application scenario of FIG. 3, when detecting that the cloud server 302 cannot provide a service, the monitoring device 301 sends the smart network interface card detection request to the terminal device 303. The smart network interface card detection request includes the identifier of the to-be-detected smart network interface card 304. The to-be-detected smart network interface card may support the network of the cloud server 302.

The terminal device 303 may determine the baseboard management controller 305 to which the to-be-detected smart network interface card 304 is connected as the target baseboard management controller.

The terminal device 303 may log into the operating system of the to-be-detected smart network interface card through the target baseboard management controller. Thus, the remote connection between the terminal device 303 and the to-be-detected smart network interface card 304 is implemented.

It should be noted that the smart network interface card has various kinds of hardware and various kinds of software, and thus the failure is easy to occur. In the existing technology, the smart network interface card has an intranet address. When the failure of the cloud server occurs and the smart network interface card needs to be detected, the smart network interface card may be accessed using the intranet address, to investigate the network failure. However, some failures make the intranet address of the smart network interface card not work well. That is, the smart network interface card cannot be accessed through the intranet address, which makes it impossible to locate the network failure.

In the method provided by the foregoing embodiment of the present disclosure, the smart network interface card detection request is acquired. Next, the baseboard management controller that is connected to the to-be-detected smart network interface card is determined as the target baseboard management controller. Then, the to-be-detected smart network interface card is logged into through the target baseboard management controller. The technical effects of the method at least include the following.

First, a new approach to logging into the smart network interface card is provided.

Second, the performing subject may remotely log into the smart network interface card. Thus, a convenient approach to login is provided.

Third, the BMC operates independently of the cloud server. When the BMC is used as the login bridge, it may be ensured that the smart network interface card is logged into. Thus, a highly reliable login approach is provided.

In some optional implementations of the present disclosure, after step 203, the method shown in this embodiment may further include detecting the to-be-detected smart network interface card.

Here, when the operating system of the smart network interface card is logged into, the hardware, the software, and the work log on the smart network interface card may be viewed. Therefore, the smart network interface card may be detected to investigate the cause of the network failure of the cloud server.

It should be noted that, when the failure of the cloud server occurs, the failure may be investigated remotely and quickly, which not only reduces the maintenance cost, but also shortens the time to recover the service.

It should be noted that the baseboard management controller may have various types of interfaces. The smart network interface card may have various types of interfaces. The connection may be performed by selecting the interfaces of the same type. Therefore, communication may be performed using the connection line of the existing standards and an identical communication protocol. Accordingly, it is convenient and quick to complete the connection between the baseboard management controller and the smart network interface card.

In the present disclosure, the smart network interface card may lead out a plurality of interfaces, and the baseboard management controller may also lead out a plurality of interfaces. According to the electrical characteristics, the interfaces may be divided into a plurality of types. According to the communication protocols followed by the interfaces, the interfaces may also be divided into a plurality of types.

In the present disclosure, the electrical characteristics of the interface of the to-be-detected smart network interface card and the interface of the target baseboard management controller that are connected to each other may be identical or different.

Optionally, for the interface of the to-be-detected smart network interface card and the interface of the target baseboard management controller that are connected to each other, their electrical characteristics are identical. If the electrical characteristics are different, the cable of the common standard (i.e., the commonly used cable) may not be applicable, and a special cable is required to connect the interface of the to-be-detected smart network interface card and the interface of the target baseboard management controller. If the electrical characteristics are identical, the cable of the common standard may be used to reduce the cost. Accordingly, when a large number of smart network interface cards are arranged in a data center, the reduction of the cost is particularly apparent.

In the present disclosure, the communication protocols followed by the interface of the to-be-detected smart network interface card and the interface of the target baseboard management controller that are connected to each other (i.e., the communication protocol characteristics) may be identical or different.

Optionally, the communication protocols followed by the interface of the to-be-detected smart network interface card and the interface of the target baseboard management controller that are connected to each other are identical. If the communication protocols are different, software or hardware for converting the communication protocols needs to be provided. If the communication protocols are identical, the communication may be directly performed, and thus, the cost that may be increased since the communication cannot be directly performed may be reduced.

In some embodiments, the connections between the to-be-detected smart network interface card and the target baseboard management controller include: the connection between an asynchronous serial interface of the target baseboard management controller and an asynchronous serial interface of the to-be-detected smart network interface card. The asynchronous serial interface is the interface of the type of a universal asynchronous receiver/transmitter (UART) interface.

In some embodiments, the connections between the to-be-detected smart network interface card and the target baseboard management controller include: the connection between a first asynchronous serial interface in the asynchronous serial interfaces of the target baseboard management controller and the smart network interface card. The first asynchronous serial interface is the factory default interface for debugging the target baseboard management controller.

Figure 4A:
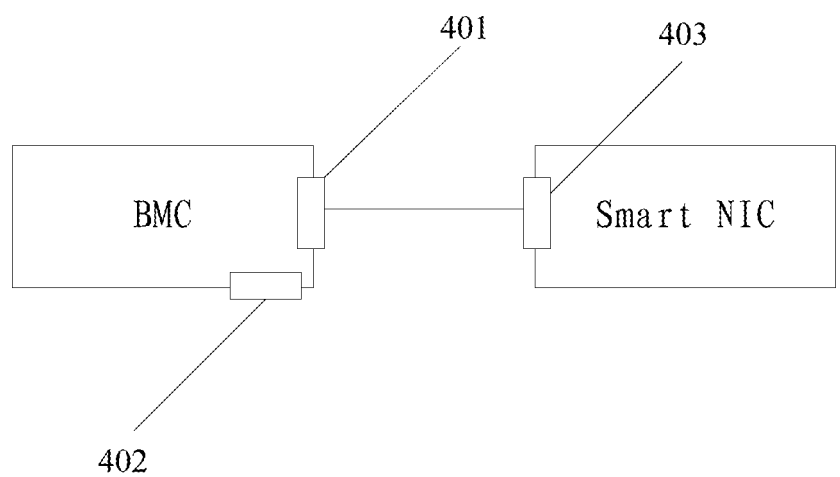
FIG. 4A is a flowchart of an illustrative connection between a to-be-detected smart network interface card and a target baseboard management controller according to the present disclosure.
Figure 4B:
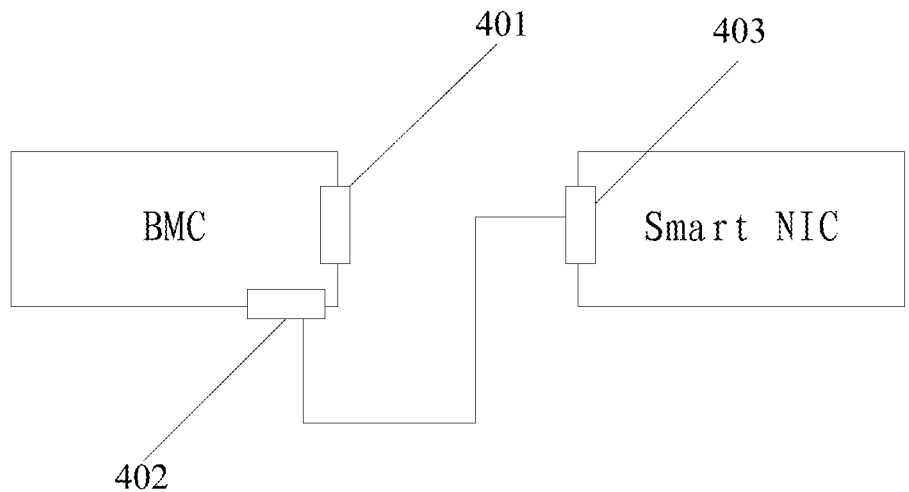
FIG. 4B is a flowchart of an illustrative connection between the to-be-detected smart network interface card and the target baseboard management controller according to the present disclosure.

As an example, referring to FIGS. 4A and 4B, illustrative connections between the to-be-detected smart network interface card and the baseboard management controller are shown. The target baseboard management controller provides two interfaces of the interface type A, which may be referred to as the interface 401 and the interface 402. The to-be-detected smart network interface card provides the interface 403 of the interface type A. In some baseboard management controller, the factory default interface 401 is the debugging interface for the target baseboard management controller. The interface 401 is exposed outside the motherboard where the baseboard management controller is located, and the interface 402 is hidden inside the motherboard where the baseboard management controller is located. As an example, the interface type A is the type of the universal asynchronous receiver/transmitter (UART) interface.

As shown in FIG. 4A, the interface 403 may be connected to the interface 401. In such case, the baseboard management controller needs to be modified, to complete the connection between the interface 403 and the interface 401. Thus, the connection between the interface of the target baseboard management controller and the interface of the to-be-detected smart network interface card that are of the same type may be achieved in the situation where the debugging function of the baseboard management controller is ensured.

As shown in FIG. 4B, the interface 402 may be connected to the interface 401. Accordingly, the connection between the interface of the target baseboard management controller and the interface of the to-be-detected smart network interface card that are of the same type may be achieved without modifying the hardware (the modifying the hardware refers to exposing the interface 402 outside).

Figure 5:
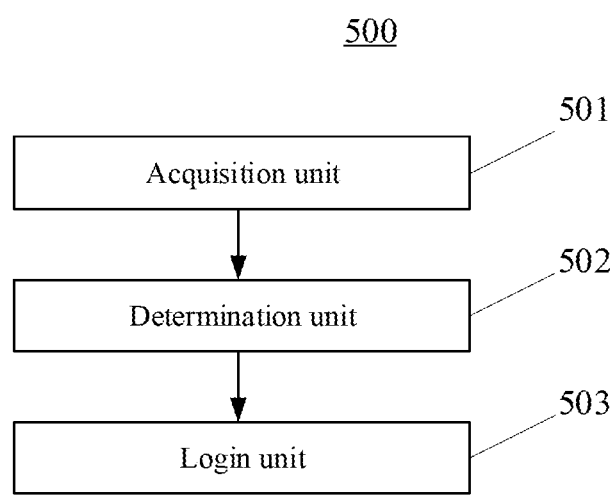
FIG. 5 is a schematic structural diagram of an embodiment of an apparatus for operating a smart network interface card according to the present disclosure.

Further referring to FIG. 5, as an implementation of the method shown in the above drawings, the present disclosure provides an embodiment of an apparatus for operating a smart network interface card. The embodiment of the apparatus corresponds to the embodiment of the method shown in FIG. 2. The apparatus may be applied to various electronic devices.

As shown in FIG. 5, the apparatus 500 for operating a smart network interface card in this embodiment includes: an acquisition unit 501, a determination unit 502, and a login unit 503. The smart network interface card is connected to a baseboard management controller. The acquisition unit is configured to acquire a smart network interface card detection request, the smart network interface card detection request includes an identifier of a to-be-detected smart network interface card. The determination unit is configured to determine a baseboard management controller that is connected to the to-be-detected smart network interface card as a target baseboard management controller. The login unit is configured to log into an operating system of the to-be-detected smart network interface card through the target baseboard management controller.

In some alternative implementations of this embodiment, an interface of the to-be-detected smart network interface card and an interface of the target baseboard management controller are connected to each other, and these two interfaces connected with each other are identical in at least one following items: electrical characteristics or communication protocol characteristics.

In some alternative implementations of this embodiment, an asynchronous serial interface of the to-be-detected smart network interface card is connected to an asynchronous serial interface of the target baseboard management controller.

In some alternative implementations of this embodiment, a first asynchronous serial interface in the asynchronous serial interfaces of the target baseboard management controller is connected to the smart network interface card. The first asynchronous serial interface is a factory default interface for debugging the target baseboard management controller.

In some alternative implementations of this embodiment, the apparatus further includes: a detection unit (not shown), configured to detect the to-be-detected smart network interface card.

In some alternative implementations of this embodiment, an interface, of the target baseboard management controller, connected to the to-be-detected smart network interface card is used as the target interface. The login unit is further configured to: send an interface relocation request to the target baseboard management controller, wherein the interface relocation request is used to request that the target interface of the target baseboard management controller is used as an interface for transmitting data between the target baseboard management controller and the smart network interface card; and log into the operating system of the to-be-detected smart network interface card through the relocated target interface.

In some alternative implementations of this embodiment, the target interface is the interface, of the target baseboard management controller, connected to the to-be-detected smart network interface card. The login unit is further configured to: log into an operating system of the target baseboard management controller; and log into the operating system of the to-be-detected smart network interface card by using the target interface and a communication protocol between the target baseboard management controller and the to-be-detected smart network interface card.

In this embodiment, for specific processes of the acquisition unit 501, the determination unit 502, and the login unit 503 in the apparatus 500 for operating a smart network interface card, and their technical effects, reference may be made to relative descriptions of step 201, step 202, and step 203 in the corresponding embodiment of FIG. 2 respectively, which will not be repeatedly described here.

It should be noted that, for the implementation details and the technical effects of the units in the apparatus for operating a smart network interface card provided by the embodiment of the present disclosure, reference may be made to the descriptions for other embodiments in the present disclosure, which will not be repeatedly described here.

Figure 6:
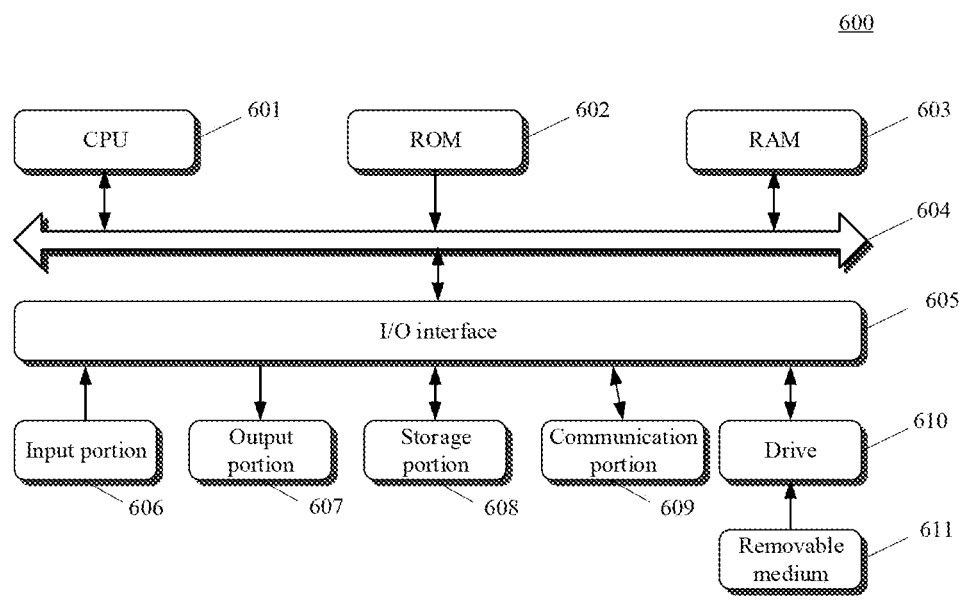
FIG. 6 is a schematic structural diagram of a computer system adapted to implement a terminal device or a server according to the embodiments of the present disclosure.

Referring to FIG. 6, a schematic structural diagram of a computer system 600 adapted to implement a terminal device or a server of some embodiments of the present application is shown. The terminal device or server shown in FIG. 6 is merely an example and should not impose any restriction on the function and scope of use of some embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in some embodiments of the present application may be implemented by means of software or hardware. The described units or modules may also be provided in a processor, for example, described as: a processor, comprising an acquisition unit, a determination unit, and a login unit, where the names of these units or modules do not in some cases constitute a limitation to such units or modules themselves. For example, the acquisition unit may also be described as "a unit for acquiring a smart network interface card detection request."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a smart network interface card detection request, the smart network interface card detection request includes an identifier of a to-be-detected smart network interface card; determine a baseboard management controller that is connected to the to-be-detected smart network interface card as a target baseboard management controller; and log into an operating system of the to-be-detected smart network interface card through the target baseboard management controller.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for operating a smart network interface card, wherein the smart network interface card is connected to a baseboard management controller, and the method comprises:

acquiring a smart network interface card detection request, the smart network interface card detection request includes an identifier of a to-be-detected smart network interface card, wherein the to-be-detected smart network interface card supports a network connection of a server computer including a first operating system and a first CPU, wherein the to-be-detected smart network interface card comprises a network address, a second random access memory operating system and a second CPU, the second random access memory operating system and the second CPU being independent from the server computer;

determining a baseboard management controller that is connected to the to-be-detected smart network interface card as a target baseboard management controller, wherein the second random access memory operating system and the second CPU of the to-be-detected smart network interface card are independent from the baseboard management controller comprising a third operating system and a third CPU;

logging into the second random access memory operating system of the to-be-detected smart network interface card through the target baseboard management controller, wherein the logging into the second random access memory operating system of the to-be-detected smart network interface card comprises:

sending login information comprising an account number and a password to the baseboard management controller;

sending, by the baseboard management controller, the login information comprising the account number and the password to the to-be-detected smart network interface card;

determining that authentication of the to-be-detected smart network interface card for the login information is successful; and logging into the second random access memory operating system of the to-be-detected smart network interface card.

2. The method according to claim 1, wherein an interface of the to-be-detected smart network interface card and an interface of the target baseboard management controller are connected to each other, and these two interfaces connected with each other are identical in at least one following items: electrical characteristics or communication protocol characteristics.

3. The method according to claim 2, wherein an asynchronous serial interface of the to-be-detected smart network interface card is connected to an asynchronous serial interface of the target baseboard management controller.

4. The method according to claim 3, wherein a first asynchronous serial interface in the asynchronous serial interfaces of the target baseboard management controller is connected to the smart network interface card, wherein the first asynchronous serial interface is a factory default interface for debugging the target baseboard management controller.

5. The method according to claim 1, wherein after the logging into the second random access memory operating system of the to-be-detected smart network interface card, the method further comprises:

detecting the to-be-detected smart network interface card.

6. The method according to claim 5, wherein the logging into the second random access memory operating system of the to-be-detected smart network interface card comprises:

sending an interface relocation request to the target baseboard management controller, wherein the interface relocation request is used to request that a target interface of the target baseboard management controller is used as an interface for transmitting data between the target baseboard management controller and the smart network interface card, wherein the target interface is an interface, of the target baseboard management controller, connected to the to-be-detected smart network interface card; and logging into the second random access memory operating system of the to-be-detected smart network interface card through the relocated target interface.

7. The method according to claim 5, wherein an interface, of the target baseboard management controller, connected to the to-be-detected smart network interface card is used as the target interface; and the logging into the second random access memory operating system of the to-be-detected smart network interface card comprises:

logging into the third operating system of the target baseboard management controller; and logging into the second random access memory operating system of the to-be-detected smart network interface card by using the target interface and a communication protocol between the target baseboard management controller and the to-be-detected smart network interface card.

8. An apparatus for operating a smart network interface card, wherein the smart network interface card is connected to a baseboard management controller, and the apparatus comprises:

at least one processor; and a memory storing instructions, the instructions cause the at least one processor to perform operations when the instructions are executed by the at least one processor, the operations comprise:

acquiring a smart network interface card detection request, the smart network interface card detection request includes an identifier of a to-be-detected smart network interface card, wherein the to-be-detected smart network interface card supports a network connection of a server computer including a first operating system and a first CPU, wherein the to-be-detected smart network interface card comprises a network address, a second random access memory operating system and a second CPU, the second random access memory operating system and the second CPU being independent from the server computer;

determining a baseboard management controller that is connected to the to-be-detected smart network interface card as a target baseboard management controller, wherein the second random access memory operating system and the second CPU of the to-be-detected smart network interface card are independent from the baseboard management controller comprising a third operating system and a third CPU;

logging into the second random access memory operating system of the to-be-detected smart network interface card through the target baseboard management controller, wherein the logging into the second random access memory operating system of the to-be-detected smart network interface card comprises:

sending login information comprising an account number and a password to the baseboard management controller;

sending, by the baseboard management controller, the login information comprising the account number and the password to the to-be-detected smart network interface card;

determining that authentication of the to-be-detected smart network interface card for the login information is successful; and logging into the second random access memory operating system of the to-be-detected smart network interface card.

9. The apparatus according to claim 8, wherein an interface of the to-be-detected smart network interface card and an interface of the target baseboard management controller are connected to each other, and these two interfaces connected with each other are identical in at least one following items: electrical characteristics or communication protocol characteristics.

10. The apparatus according to claim 9, wherein an asynchronous serial interface of the to-be-detected smart network interface card is connected to an asynchronous serial interface of the target baseboard management controller.

11. The apparatus according to claim 10, wherein a first asynchronous serial interface in the asynchronous serial interfaces of the target baseboard management controller is connected to the smart network interface card, wherein the first asynchronous serial interface is a factory default interface for debugging the target baseboard management controller.

12. The apparatus according to claim 8, wherein after the logging into the second random access memory operating system of the to-be-detected smart network interface card, the operations further comprise:
  detecting the to-be-detected smart network interface card.

13. The apparatus according to claim 12, wherein the logging into the second random access memory operating system of the to-be-detected smart network interface card comprises:
  sending an interface relocation request to the target baseboard management controller, wherein the interface relocation request is used to request that a target interface of the target baseboard management controller is used as an interface for transmitting data between the target baseboard management controller and the smart network interface card, wherein the target interface is an interface, of the target baseboard management controller, connected to the to-be-detected smart network interface card; and
  logging into the second random access memory operating system of the to-be-detected smart network interface card through the relocated target interface.

14. The apparatus according to claim 12, wherein an interface, of the target baseboard management controller, connected to the to-be-detected smart network interface card, is used as the target interface; and
  the logging into the second random access memory operating system of the to-be-detected smart network interface card comprises:
  logging into the third operating system of the target baseboard management controller; and
  logging into the second random access memory operating system of the to-be-detected smart network interface card by using the target interface and a communication protocol between the target baseboard management controller and the to-be-detected smart network interface card.

15. A non-transitory computer-readable storage medium storing a computer program, the computer program causes one or more processors to perform operations when the computer program is executed by one or more processors, the operations comprising:
  acquiring a smart network interface card detection request, the smart network interface card detection request includes an identifier of a to-be-detected smart network interface card, wherein the to-be-detected smart network interface card supports a network connection of a server computer including a first operating system and a first CPU, wherein the to-be-detected smart network interface card comprises a network address, a second random access memory operating system and a second CPU, the second random access memory operating system and the second CPU being independent from the server computer;
  determining a baseboard management controller that is connected to the to-be-detected smart network interface card as a target baseboard management controller, wherein the second random access memory operating system and the second CPU of the to-be-detected smart network interface card are independent from the baseboard management controller comprising a third operating system and a third CPU;
  logging into the second random access memory operating system of the to-be-detected smart network interface card through the target baseboard management controller, wherein the logging into the second random access memory operating system of the to-be-detected smart network interface card comprises:
  sending login information comprising an account number and a password to the baseboard management controller;
  sending, by the baseboard management controller, the login information comprising the account number and the password to the to-be-detected smart network interface card;
  determining that authentication of the to-be-detected smart network interface card for the login information is successful; and
  logging into the second random access memory operating system of the to-be-detected smart network interface card.

16. The method according to claim 1, wherein the to-be-detected smart network interface card further includes a CPU and a hardware acceleration unit.

17. The method according to claim 1, wherein the first operating system, the second random access memory operating system and the third operating system are independent from each other, and the first CPU, the second CPU and the third CPU are independent from each other.

18. The method according to claim 1, wherein an asynchronous serial interface of the to-be-detected smart network interface card is connected to an asynchronous serial interface of the baseboard management controller.

19. The method according to claim 1, wherein the to-be-detected smart network interface card connects both the server computer and a network switch, wherein the method further comprises: determining a cause of a network failure of the server computer by viewing a work log on the smart network interface card.

* * * * *